(12) United States Patent
Platt et al.

(10) Patent No.: US 8,171,069 B2
(45) Date of Patent: *May 1, 2012

(54) STREAMING DIGITAL DATA FILTER

(75) Inventors: Timothy M. Platt, Williston, VT (US); Richard Jean-Luc St-Pierre, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 1056 days.

This patent is subject to a terminal disclaimer.

(21) Appl. No.: 12/100,448

(22) Filed: Apr. 10, 2008

(65) Prior Publication Data

US 2009/0259822 A1 Oct. 15, 2009

(51) Int. Cl.
    G06F 17/10 (2006.01)
(52) U.S. Cl. ...................................................... 708/304
(58) Field of Classification Search .................. None
    See application file for complete search history.

(56) References Cited

U.S. PATENT DOCUMENTS

| | | | |
|---|---|---|---|
| 5,138,567 A | 8/1992 | Mehrgardt | |
| 5,144,568 A | 9/1992 | Glover | |
| 5,708,595 A | 1/1998 | Connell | |
| 5,862,064 A * | 1/1999 | Bae et al. | 708/304 |
| 5,968,111 A * | 10/1999 | Bae et al. | 708/202 |
| 6,018,750 A | 1/2000 | Connell et al. | |
| 6,987,401 B1 | 1/2006 | Langhammer et al. | |
| 7,050,647 B2 * | 5/2006 | Yamazaki | 382/262 |
| 7,328,230 B2 * | 2/2008 | Aldrich et al. | 708/445 |
| 8,051,120 B2 * | 11/2011 | Platt et al. | 708/304 |
| 2007/0027944 A1 | 2/2007 | Wilson et al. | |
| 2008/0016134 A1 * | 1/2008 | Klima et al. | 708/202 |
| 2009/0259823 A1 * | 10/2009 | Platt et al. | 712/4 |
| 2011/0099215 A1 * | 4/2011 | Bhattacharjee et al. | 708/202 |

* cited by examiner

*Primary Examiner* — David H Malzahn
(74) *Attorney, Agent, or Firm* — Schmeiser, Olsen & Watts; Anthony Canale

(57) ABSTRACT

A method of filtering streaming digital data in real time. The method including: (a) initializing and storing a set of m data elements and an associated set of m pointer data from 1 to m in sequence, m an integer greater than 2; (b) receiving in real time a first or next data element of a digital data stream of sequential data elements; (c) simultaneously with (b), replacing a stored data element associated with the pointer datum m with the received data element, changing the pointer datum of m to 1, and incrementing the value of all other pointer data by 1; (d) simultaneously with (b) sorting in order from a low to high all stored data elements; (e) simultaneously with (b), maintaining the association of pointer datum and data elements; (f) simultaneously with (b), filtering all stored data elements; and (g) repeating (b) through (f) multiple times.

10 Claims, 3 Drawing Sheets

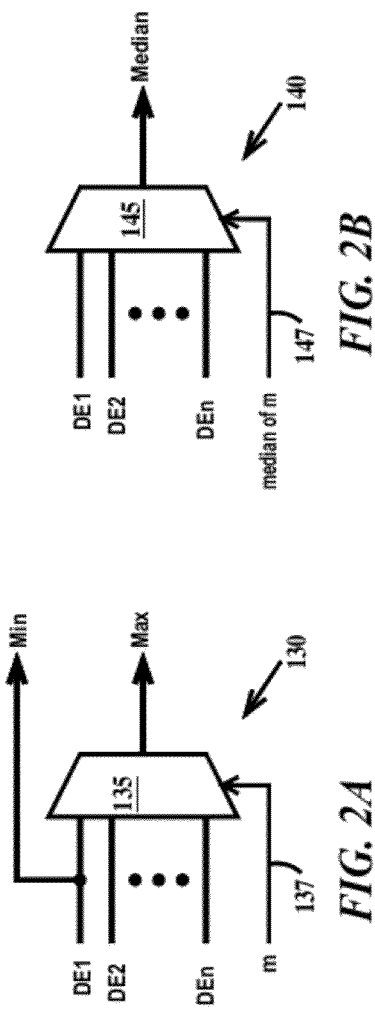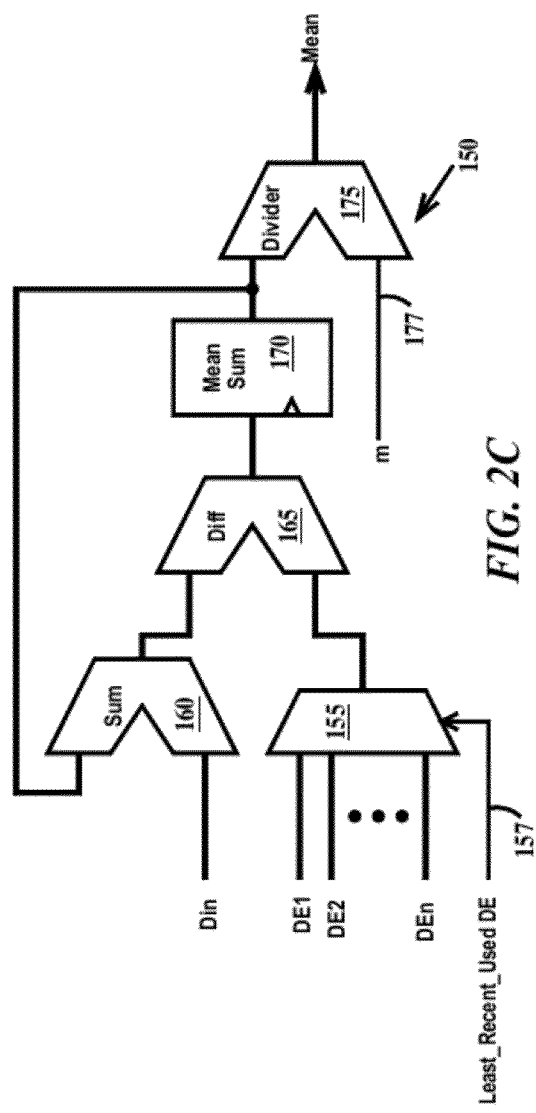

STREAMING DIGITAL DATA FILTER

The present application is related to U.S. patent application Ser. No. 12/100,462, filed Apr. 10, 2008, now U.S. Pat. No. 8,051,120 issued Oct. 15, 2011.

FIELD OF THE INVENTION

The present invention relates to the field of digital filters; more specifically, it relates to a method, circuit and design structure for filtering of data streams in real time.

BACKGROUND OF THE INVENTION

Digital filters are used to modify digital data streams and find wide use in picture and video processing for such process as, for example, noise filtering. Digital filters find use in other applications as well (e.g. digital signal processing). A problem with existing digital filters is the delay they insert in the data stream because they take time to process the data. When large amounts of data are being processes, as, for example, in video applications these delays can be significant, particularly when video data has been encoded in multi-dimensional formats and several types of information must be filtered and subsequently processed and coordinated for display on a video device or used for other analysis. In video applications, these delays can manifest themselves in delays in display when video equipment such as satellite and cable set-top boxes are operating. Therefore, there is an ongoing need for faster digital filters.

SUMMARY OF THE INVENTION

A first aspect of the present invention is a method of filtering a digital data stream, comprising: providing a digital data processing circuit comprising a data processing unit, a pointer processing unit and control logic, the data processing unit and the pointer processing units connected to the control logic, the pointer processing unit consisting of n serially connected pointer processing stages from a first pointer processing stage to a last pointer processing stage, all pointer processing stages of the pointer processing unit including a pointer register, second to next to last pointer processing stages of the pointer processing unit including a multiplexer, wherein n is a positive integer greater than 2, the data processing unit consisting of n serially connected data processing stages from a first data processing stage to a last data processing stage, each data processing stage of the data processing unit including a multiplexer, a data register and a comparator, and providing one or more filter output stages connected to the data processing unit; and performing: (a) initializing and storing in the data registers a set of n data elements of pre-selected values and initializing and storing in the pointer registers, from a pointer register of the first stage of the pointer processing unit to a pointer register of the last stage of the pointer processing unit, a set of m pointer data from 1 to m in ascending sequence, each stored data element associated with a respective pointer datum, where m is a positive integer greater than 2 and less than or equal to n; (b) receiving in real time a first or next data element of a digital data stream of sequential data elements; (c) simultaneously with (b), replacing a stored data element associated with the pointer datum having a value of n with the received data element thereby storing the received data element in a data register of the data unit, changing pointer datum m to 1, and incrementing the value of all other pointer data by 1, the pointer data indicating the relative sequence in which data elements are received; (d) simultaneously with (b) sorting in order from a lowest data element value to highest data element value all stored data elements and storing the stored data elements in sequence from a lowest value to a highest value in the data registers; (e) simultaneously with (b), maintaining the association of each pointer datum to its respective data element by shifting pointer data between pointer registers; (f) simultaneously with (b), filtering all stored data elements; and (g) repeating (b) through (f) multiple times.

A second aspect of the present invention is a method of filtering a digital data stream, comprising: (a) initializing and storing a set of m data elements of pre-selected values and initializing and storing a set of m pointer data from 1 to m in ascending sequence, each stored data element associated with a respective pointer datum, where m is a positive integer greater than 2; (b) receiving in real time a first or next data element of a digital data stream of sequential data elements; (c) simultaneously with (b), replacing a stored data element associated with the pointer datum having a value of m with the received data element thereby storing the received data element, changing the pointer datum of m to 1, and incrementing the value of all other pointer data by 1, the pointer data indicating the relative sequence in which data elements are received; (d) simultaneously with (b) sorting in order from a lowest data element value to highest data element value all stored data elements; (e) simultaneously with (b), maintaining the association of each pointer datum to its respective data element; (f) simultaneously with (b), filtering all stored data elements; and (g) repeating (b) through (f) multiple times.

BRIEF DESCRIPTION OF THE DRAWINGS

The features of the invention are set forth in the appended claims. The invention itself, however, will be best understood by reference to the following detailed description of an illustrative embodiment when read in conjunction with the accompanying drawings, wherein:

FIG. 2A is a circuit diagram of a streaming minimum/maximum output stage for use with the digital processing circuit of FIG. 1;

FIG. 2B is a circuit diagram of a streaming median output stage for use with the digital processing circuit of FIG. 1;

FIG. 2C is a circuit diagram of a streaming mean output stage for use with the digital processing circuit of FIG. 1.

DETAILED DESCRIPTION OF THE INVENTION

Figure 1:
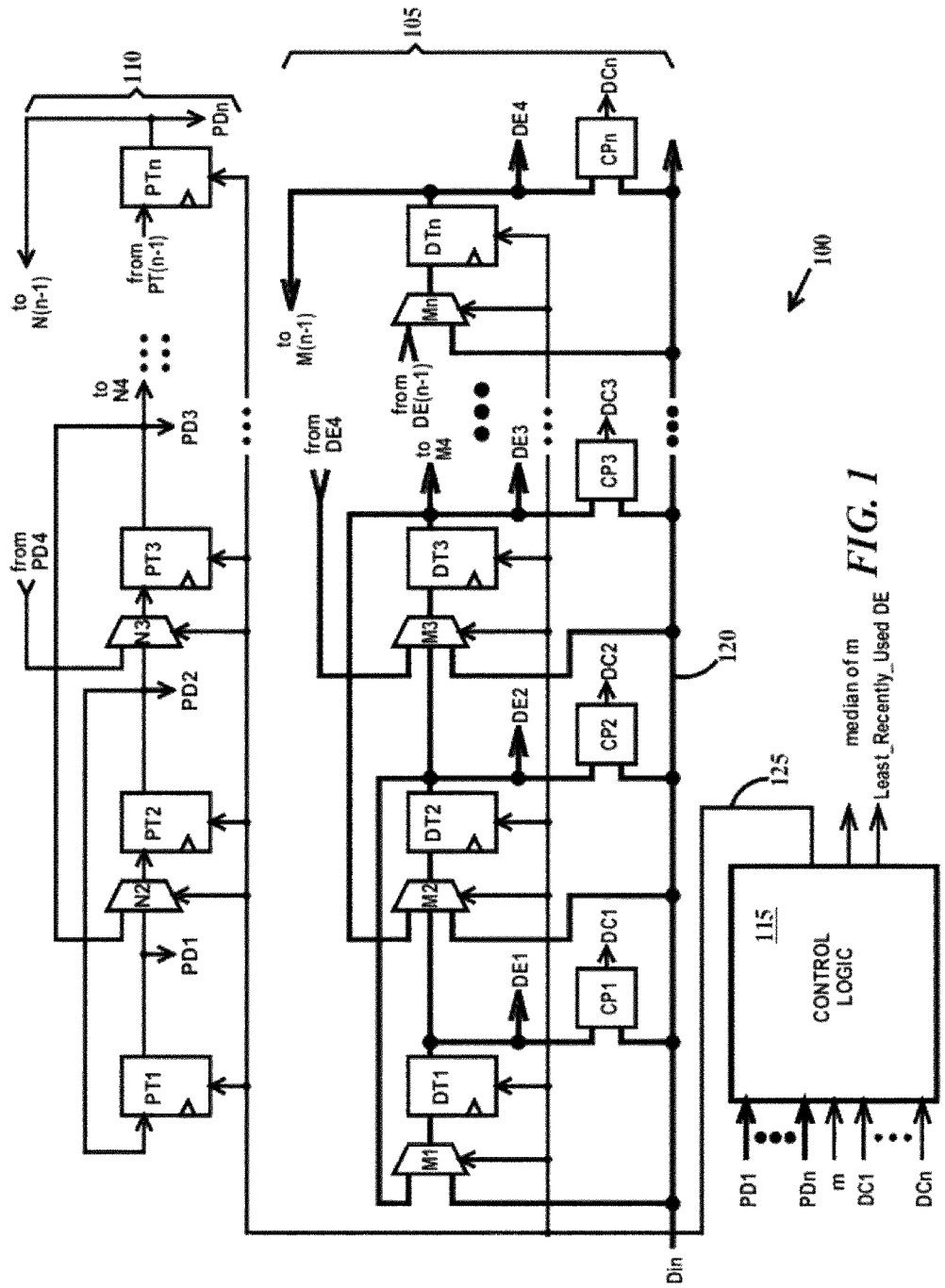
FIG. 1 is a circuit diagram of the digital processing circuit of a streaming digital data filter used in various digital filter types according to embodiments of the present invention.

FIG. 1 is a circuit diagram of the digital processing circuit of a streaming digital data filter used in various digital filter types according to embodiments of the present invention. In FIG. 1, data buses are shown as heavy lines and control signal buses are shown as light lines. Din represents the current data element of a digital data stream of data elements. In FIG. 1, a digital processing circuit 100 includes a data processing unit 105, a pointer unit 110, and control logic 115.

Data processing unit 105 includes n serially connected processing stages, each processing stage including a multiplexer (Mx), a data register (DTx) and a comparator (CPx) where n is a positive integer greater than 2 and x is a positive integer from 1 to n. Multiplexers M2 to Mn−1 have three inputs, multiplexers M1 and Mn have two inputs. An input of each multiplexer M1 to Mn is connected to a streaming digital data bus 120. A first input of each comparator CP1 to CPn is connected to data bus 120. Within each processing stage, the output of each multiplexer Mx is connected to a data input of corresponding data register Dx. Except for data register DTn, the output of each data register DTx is connected to the multiplexer Mx+1 of the subsequent data processing stage. In other words, the output of each data register is connected to the multiplexer of the subsequent data processing stage, except for the output of the data register of the last data processing stage. Except for the output of data register DT1, the output of each data register DTx is connected to an input of a multiplexer DT(x−1) of a previous data processing stage. The output of each data register DT1 to DTn is a respective data element DE1 to DEn. The output of each comparator CP1 to CPn is a respective data compare signal DC1 to DCn. Each comparator CPx compares respective data elements DEx to the current data element Din of the data stream on data bus 120. The respective data compare signals DCx indicate if DEx is greater than or equal to Din or less than Din. Data element values are stored in data registers DE1 to DEn sorted from the smallest value in data register DE1 to the largest value in data register DEn. Data elements DEx are digital encodes of the value of a data element, so the number of bits in each data register must be large enough to store the largest value possible in the data stream. For example, if the data stream is encoding 256 shades of gray then the data registers must be at least 8 bits wide.

Pointer processing unit 110 includes n serially connected pointer processing stages, each pointer processing stage of pointer processing unit 110 including a pointer register PTx and for the x=2 to x=n−1 pointer processing stages also including a multiplexer Nx. For the x=2 to x=n−1 pointer processing stages of pointer processing unit 110, an output of a previous stage's pointer register is connected a first input of an immediately next stage's multiplexer. An output of pointer register PTn−1 is directly connected to an input of pointer register PTn. An output of pointer register PT2 is directly connected to an input of pointer register PT1. The output of each pointer register PTx is respective pointer data PDx. Each pointer register PTx is associated with a corresponding data register DTx. Pointer data indicates the relative sequence in which each of the data elements was stored in said data registers DT1 to DTn.

As processing occurs, the oldest value in DTx (e.g. DTold) is discarded, the incoming data Din from bus 120 is compared to the current value in each DTx to determine the DTnew where the new value should be stored, values in DTx from the location of the DTnew to DTold are adjusted (i.e. shifted) to create an empty DTempty where the new value from Din (bus 120) will be stored thereby continuously maintaining a sorted order in DTx. Pointer data are digital encodes of the value of the pointer, so the number of bits in each pointer register must be large enough to store the largest possible pointer value. The largest possible value for pointer data is n.

Pointer data PD1 to PDn and data compared signals DC1 to DCn are connected to inputs of control logic 115. The output of control logic 115 is connected to a control bus 125. Control bus 125 is connected to select inputs of each multiplexer M1 to Mn, multiplexers N1 to Nn, to write enable inputs of each data register DT1 to DTn and to write enable inputs of each pointer register PT1 to PTn. Pointer registers PT1 to PTn are always associated with corresponding data registers DT1 to DTn by control logic 115. No data elements from the digital data stream or processing unit 105 are passed to pointer unit 110.

Note, the pointer data is discarded and maintained (i.e. shifted) in the same manner as data elements. However, the value of the pointer is incremented by 1 for all non-discarded data elements. At this point, it should be understood that digital filter of the embodiments of the present invention are not constrained to filter only groups of n data elements. Digital filter of the embodiments of the present invention may process m data elements where m is less than or equal to n. The least recently used data element is the data element having a pointer data value of m. The value of m, is an input to control logic 115. An optional output of control logic 115 is a signal Least_Recently_Used_DE. The value of Least_Recently_Used_DE is the value of x of pointer register PT(x) containing the value of m. A control signal, median of m, is generated by control logic 115 where median of m=median of the integer sequence 1 to m. For example, If m=7 then median of m=4.

An example of the operation of digital processing circuit for a 5 element filter is given in the following tables:

In the table labeled initialization, data in the data registers has been initialized to pre-selected values (in this example, 0) and data in the pointer registers from the first pointer register to the last pointer register has been arranged in ascending sequence from 1 to n (in this example n=5).

| Initialization. | | | | | |
|---|---|---|---|---|---|
| | Register(s) | | | | |
| | 1 | 2 | 3 | 4 | 5 |
| Pointer | 1 | 2 | 3 | 4 | 5 |
| Data | 0 | 0 | 0 | 0 | 0 |

In the following tables, the association of each pointer datum to its respective data element is maintained by shifting pointer data between pointer registers in the same manner as the data elements are shifted for sorting.

| Filling, First Data Element (Din = 3) | | | | | |
|---|---|---|---|---|---|
| | Register(s) | | | | |
| | 1 | 2 | 3 | 4 | 5 |
| Pointer | 2 | 3 | 4 | 5 | 1 |
| Data | 0 | 0 | 0 | 0 | 3 |

| Filling, Second Data Element (Din = 20) | | | | | |
|---|---|---|---|---|---|
| | Register(s) | | | | |
| | 1 | 2 | 3 | 4 | 5 |
| Pointer | 3 | 4 | 5 | 2 | 1 |
| Data | 0 | 0 | 0 | 3 | 20 |

| Filling, Third Data Element (Din = 7) | | | | | |
|---|---|---|---|---|---|
| | Register(s) | | | | |
| | 1 | 2 | 3 | 4 | 5 |
| Pointer | 4 | 5 | 3 | 1 | 2 |
| Data | 0 | 0 | 3 | 7 | 20 |

| Filling, fourth Data Element (Din = 11) | | | | | |
|---|---|---|---|---|---|
| | Register(s) | | | | |
| | 1 | 2 | 3 | 4 | 5 |
| Pointer | 5 | 4 | 2 | 1 | 3 |
| Data | 0 | 3 | 7 | 11 | 20 |

| Filling Complete, fifth Data Element (Din = 11) | | | | | |
|---|---|---|---|---|---|
| | Register(s) | | | | |
| | 1 | 2 | 3 | 4 | 5 |
| Pointer | 5 | 3 | 2 | 1 | 4 |
| Data | 3 | 7 | 11 | 13 | 20 |

| New Data, (Din = 12) Discard DE1, Shift DE2 and DE3 left, New DE to DE3 | | | | | |
|---|---|---|---|---|---|
| | Register(s) | | | | |
| | 1 | 2 | 3 | 4 | 5 |
| Pointer | 4 | 3 | 1 | 2 | 5 |
| Data | 7 | 11 | 12 | 13 | 20 |

| New Data, (Din = 9) Discard DE5, Shift DE1 and DE2 left, New DE to DE2 | | | | | |
|---|---|---|---|---|---|
| | Register(s) | | | | |
| | 1 | 2 | 3 | 4 | 5 |
| Pointer | 5 | 1 | 4 | 2 | 3 |
| Data | 7 | 9 | 11 | 12 | 13 |

| New Data, (Din = 2) Discard DE1, new DE to DE1 | | | | | |
|---|---|---|---|---|---|
| | Register(s) | | | | |
| | 1 | 2 | 3 | 4 | 5 |
| Pointer | 1 | 2 | 5 | 3 | 4 |
| Data | 2 | 9 | 11 | 12 | 13 |

| New Data, (Din = 10) Discard DE3, new DE to DE3 | | | | | |
|---|---|---|---|---|---|
| | Register(s) | | | | |
| | 1 | 2 | 3 | 4 | 5 |
| Pointer | 2 | 3 | 1 | 4 | 5 |
| Data | 2 | 9 | 10 | 12 | 13 |

| New Data, (Din = 25) Discard DE5, new DE to DE5 | | | | | |
|---|---|---|---|---|---|
| | Register(s) | | | | |
| | 1 | 2 | 3 | 4 | 5 |
| Pointer | 3 | 4 | 2 | 5 | 1 |
| Data | 2 | 9 | 10 | 12 | 25 |

| New Data, (Din = 6) Discard DE4, Shift DE2 and DE3 right, New DE to DE2 | | | | | |
|---|---|---|---|---|---|
| | Register(s) | | | | |
| | 1 | 2 | 3 | 4 | 5 |
| Pointer | 4 | 1 | 5 | 3 | 2 |
| Data | 2 | 6 | 9 | 10 | 25 |

Note, that in each table of the example (1) the least recently used data element and its pointer are deleted, (2) the comparators are used to determine into which data register the new Din should be stored, (3) all data elements and corresponding pointers are shifted from the registers of the new entry to toward the registers of the just deleted data element, (4) the new Din is inserted and its pointer set to 1, and (5) all other pointers are incremented by 1.

FIG. 2A is a circuit diagram of a minimum/maximum output stage for use with the digital processing circuit 100 of FIG. 1. In FIG. 2A, a maximum/minimum output stage 130 includes an n input multiplexer 135 responsive to a select signal on a select line 137 connected to the select input of the multiplexer. Each of the n inputs of multiplexer 135 are connected to a respective data element DE1 to DEn from the outputs of respective data registers DT1 to DTn. The select signal is set to m to generate a maximum of DE1 through DEm. Setting the select signal to 1 would generate the minimum of DE1 to DEm, but because of the sorting of digital processing unit 100 of FIG. 1, data element DE1 is the minimum of DE1 through DEm.

FIG. 2B is a circuit diagram of a median output stage for use with the digital processing circuit 100 of FIG. 1. In FIG. 2B, a median output stage 140 includes an n input multiplexer 145 responsive to a select signal on a select line 147 connected to the select input of the multiplexer. Each of the n inputs of multiplexer 145 are connected to a respective data element DE1 to DEn from the outputs of respective data registers DT1 to DTn. The select signal is set to "median of m" to generate a median of DE1 through DEm when "median of m" is an odd number because of the sorting of digital processing unit 100 of FIG. 1. If "median of m" is an even number then some combination logic is included in multiplexer to generate the average of the two center data element values.

FIG. 2C is a circuit diagram of a streaming mean output stage for use with the digital processing circuit 100 of FIG. 1. In FIG. 2C, a mean output stage 130 includes an n input multiplexer 155 responsive to a select signal on a select line 157 connected to the select input of the multiplexer. Each of the n inputs of multiplexer 155 are connected to a respective data element DE1 to DEn from the outputs of respective data registers DT1 to DTn. The select signal is set to Least_Recently_Used_DE from control logic 115 of digital processing unit 100 of FIG. 1. Mean output stage 150 further includes a summation unit 160, a difference unit 165, a mean sum register 170 and a divider 175 Divider 175 uses the digital value of m to produce the mean (i.e. average) of the most recent m values of the data stream. A first input of summation unit 160 is connected to Din. The output of multiplexer 155 is connected to a first input of difference unit 165 and the output of summation unit 160 is connected to a second input of difference unit 165. The output of difference unit 165 is connected to the input of the mean sum register 170. The output of mean sum register 170 is connected to a second input of summation unit 160 so that the total of the most recent m values in the data stream can be accumulated (i.e. summed). The output of mean sum register 170 is connected to the input of divider 175, with m applied to the second input. The output of divider 175 is the mean of DE1 to DEm. The output of summation unit 160 is the sum of the output of mean sum register 170 and Din. The output of difference unit 165 is the difference between the output of summation unit 160 and multiplexer 155. The mean sum register accumulates the sum of the last m data elements, including subtracting the oldest value. The output of mean sum register 170 is the sum of the most recent m values from the data stream. The output of divider 175 is the input of divider 175 divided by m.

Figure 3:
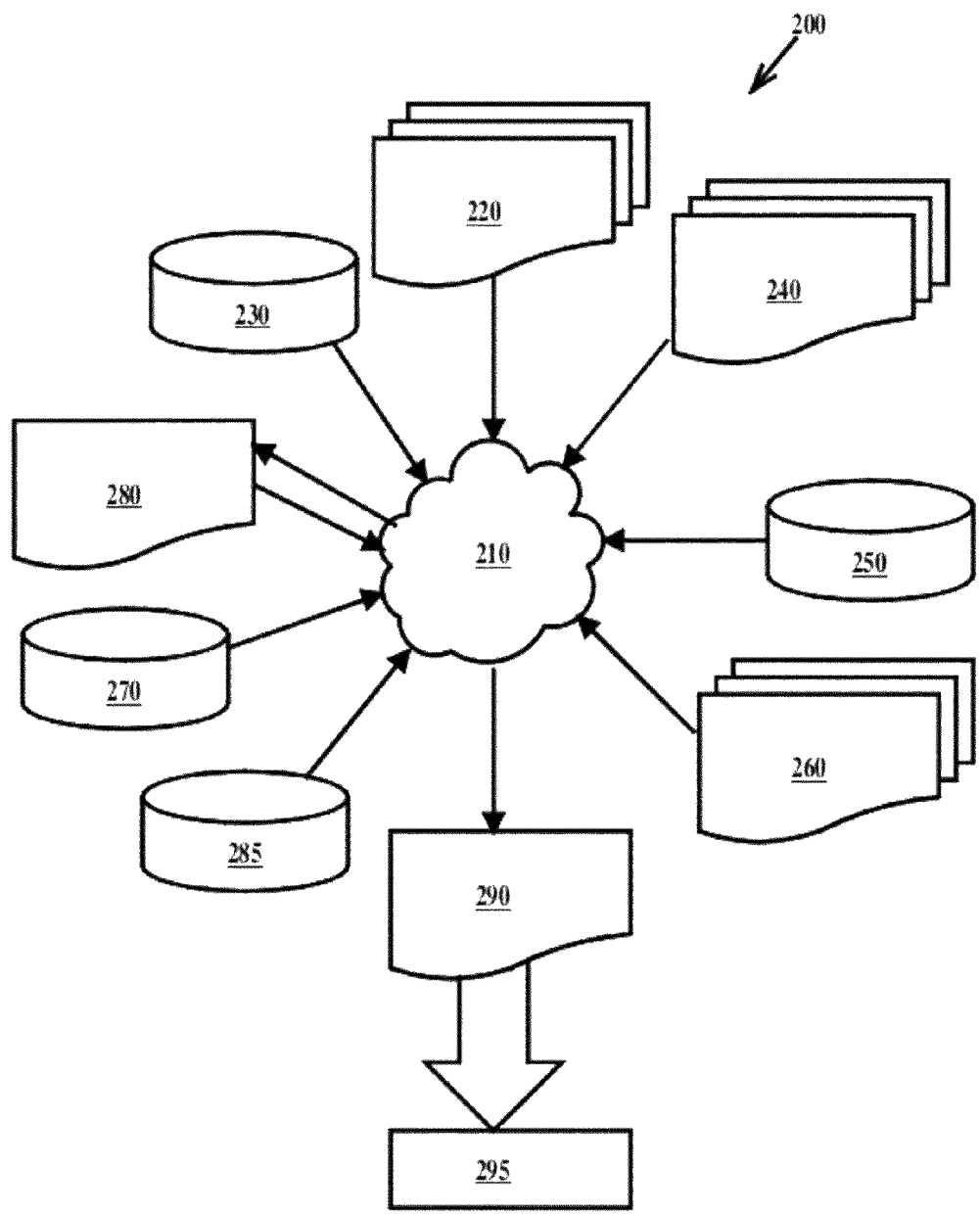
FIG. 3 shows a block diagram of an exemplary design flow 200 used for example, in semiconductor design, manufacturing, and/or test.

FIG. 3 shows a block diagram of an exemplary design flow 200 used for example, in semiconductor design, manufacturing, and/or test. Design flow 200 may vary depending on the type of IC being designed. For example, a design flow 200 for building an application specific IC (ASIC) may differ from a design flow 200 for designing a standard component. Design structure 220 is preferably an input to a design process 210 and may come from an IP provider, a core developer, or other design company or may be generated by the operator of the design flow, or from other sources. Design structure 220 comprises an embodiment of the invention as shown in FIGS. 1, 2A, 2B and 2C in the form of schematics or HDL, a hardware-description language (e.g., Verilog, VHDL, C, etc.). Design structure 220 may be contained on one or more machine readable medium. For example, design structure 220 may be a text file or a graphical representation of an embodiment of the invention as shown in FIGS. 1, 2A, 2B and 2C. Design process 210 preferably synthesizes (or translates) an embodiment of the invention as shown in FIGS. 1, 2A, 2B and 2C into a netlist 280, where netlist 280 is, for example, a list of wires, transistors, logic gates, control circuits, I/O, models, etc. that describes the connections to other elements and circuits in an integrated circuit design and recorded on at least one of machine readable medium. For example, the medium may be a CD, a compact flash, other flash memory, a packet of data to be sent via the Internet, or other networking suitable means. The synthesis may be an iterative process in which netlist 280 is resynthesized one or more times depending on design specifications and parameters for the circuit.

Design process 210 may include using a variety of inputs; for example, inputs from library elements 230 which may house a set of commonly used elements, circuits, and devices, including models, layouts, and symbolic representations, for a given manufacturing technology (e.g., different technology nodes, 32 nm, 45 nm, 20 nm, etc.), design specifications 240, characterization data 250, verification data 260, design rules 270, and test data files 285 (which may include test patterns and other testing information). Design process 210 may further include, for example, standard circuit design processes such as timing analysis, verification, design rule checking, place and route operations, etc. One of ordinary skill in the art of integrated circuit design can appreciate the extent of possible electronic design automation tools and applications used in design process 210 without deviating from the scope and spirit of the invention. The design structure of the invention is not limited to any specific design flow.

Design process 210 preferably translates an embodiment of the invention as shown in FIGS. 1, 2A, 2B and 2C, along with any additional integrated circuit design or data (if applicable), into a second design structure 220. Design structure 220 resides on a storage medium in a data format used for the exchange of layout data of integrated circuits and/or symbolic data format (e.g. information stored in a GDSII (GDS2), GL1, OASIS, map files, or any other suitable format for storing such design structures). Design structure 220 may comprise information such as, for example, symbolic data, map files, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1, 2A, 2B and 2C. Design structure 220 may then proceed to a stage 225 where, for example, design structure 220: proceeds to tape-out, is released to manufacturing, is released to a mask house, is sent to another design house, is sent back to the customer, etc.

Thus the streaming digital filters of the embodiments of the present invention provide real time filtering, and because of the capability for real time filtering are faster then current digital filters.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A method of filtering a digital data stream, comprising:
providing a digital data processing circuit comprising a data processing unit, a pointer processing unit and control logic, said data processing unit and said pointer processing units connected to said control logic, said pointer processing unit consisting of n serially connected pointer processing stages from a first pointer processing stage to a last pointer processing stage, all pointer processing stages of said pointer processing unit including a pointer register, second to next to last pointer processing stages of said pointer processing unit including a multiplexer, wherein n is a positive integer greater than 2, said data processing unit consisting of n serially connected data processing stages from a first data processing stage to a last data processing stage, each data processing stage of said data processing unit including a multiplexer, a data register and a comparator, and providing one or more filter output stages connected to said data processing unit; and performing:
- (a) initializing and storing in said data registers a set of m data elements of pre-selected values and initializing and storing in said pointer registers, from a pointer register of said first stage of said pointer processing unit to a pointer register of said last stage of said pointer processing unit, a set of m pointer data from 1 to m in ascending sequence, each stored data element associated with a respective pointer datum, where m is a positive integer greater than 2 and less than or equal to n;
- (b) receiving in real time a first or next data element of a digital data stream of sequential data elements;
- (c) simultaneously with (b), replacing a stored data element associated with the pointer datum having a value of m with said received data element thereby storing said received data element in a data register of said data unit, changing pointer datum m to 1, and incrementing the value of all other pointer data by 1, said pointer data indicating the relative sequence in which data elements are received;
- (d) simultaneously with (b) sorting in order from a lowest data element value to highest data element value all stored data elements and storing said stored data elements in sequence from a lowest value to a highest value in said data registers;
- (e) simultaneously with (b), maintaining the association of each pointer datum to its respective data element by shifting pointer data between pointer registers;
- (f) simultaneously with (b), filtering all stored data elements; and
- (g) repeating (b) through (f) multiple times.

2. The method of claim 1, wherein:
for said second to said next to last pointer processing stages of said pointer processing unit, an output of a stage's pointer register connected to a first input of an immediately next stage's multiplexer, an output of stage's pointer register connected to a second input of an immediately prior stage's multiplexer, an output of a pointer register of said next to last pointer register connected to an input of a pointer register of said last pointer processing stage, and an output of said pointer register of said second pointer register connected to an input of a pointer register of said first pointer register; and
an output of each pointer register is connected to said control logic.

3. The method of claim 1, wherein:
for each data processing stage of said data processing unit, a first input of the stage's multiplexer is connected to a streaming digital data bus, an output of the stage's multiplexer is connected to an input of said data register, an output of the stage's data register is connected to a first input of the stage's comparator, and a second input of the stage's comparator is connected to said streaming digital data bus;
for each data processing stage of said data processing unit except for said first data processing stage, an output of a previous stage's data register is connected to a second input of its multiplexer;
for each data processing stage of said data processing unit, except for said last data processing stage, an output of a data register of an immediately subsequent stage's multiplexer is connected a third input of its multiplexer
select inputs of each data processing stages multiplexer connected to said control logic;
enable inputs of each data processing stage's data register connected to said control logic; and
an output of each comparator of each data processing stage of said data processing unit connected to said control logic.

4. The method of claim 1, wherein a filter stage of said one or more filter stages is connected to each output of each data register of each data processing stage and is configured to generate a minimum and a maximum of m consecutive data elements of said digital data stream, where m is a positive integer no greater than n.

5. The method of claim 1, wherein a filter stage of said one or more filter stages is connected to each output of each data register of each data processing stage and is configured to generate a median of m consecutive data elements of said digital data stream, where m is a positive integer no greater than n.

6. The method of claim 1, wherein a filter stage of said one or more filter stages is connected to each output of each data register of each data processing stage, is connected to said streaming digital data bus, is connected to a Least_Recently_Used_DE signal from said control logic and is configured to generate a mean of m consecutive data elements of said digital data stream, where m is a positive integer no greater than n, said Least_Recently_Used_DE signal indicating which data register of which stage of said data processing stages is storing the oldest data element captured from said digital data stream.

7. The method of claim 1, wherein said filter stage comprises:
a filter stage multiplexer having inputs connected to outputs of said data registers of said data processing stages of said processing unit and an output connected to a first input of a difference unit;
a summation unit having a first input connected to said streaming data bus and an output connected to a second input of said difference unit; and
a summation register, an input of said summation register connected to an output of said difference unit and an output of said summation register connected to a second input of said summation unit and to a first input of a divider, a second input of said divider connected to a signal indicating a value of m, the output of said divider being said mean of m consecutive data elements of said digital data stream.

8. The method of claim 1, wherein said filtering includes determining a minimum, a maximum, a median, a mean or combinations thereof of said m sequential data elements.

9. A method of filtering a digital data stream, comprising:
- (a) initializing and storing a set of m data elements of pre-selected values and initializing and storing a set of m pointer data from 1 to m in ascending sequence, each stored data element associated with a respective pointer datum, where m is a positive integer greater than 2;
- (b) receiving in real time a first or next data element of a digital data stream of sequential data elements;
- (c) simultaneously with (b), replacing a stored data element associated with the pointer datum having a value of m with said received data element thereby storing said received data element, changing the pointer datum of m to 1, and incrementing the value of all other pointer data by 1, said pointer data indicating the relative sequence in which data elements are received;
- (d) simultaneously with (b) sorting in order from a lowest data element value to highest data element value all stored data elements;
- (e) simultaneously with (b), maintaining the association of each pointer datum to its respective data element;
- (f) simultaneously with (b), filtering all stored data elements; and
- (g) repeating (b) through (f) multiple times.

10. The method of claim 9, wherein said filtering includes determining a minimum, a maximum, a median, a mean or combinations thereof of said m sequential data elements.

* * * * *